(12) United States Patent
Itoh

(10) Patent No.: US 11,563,872 B2
(45) Date of Patent: Jan. 24, 2023

(54) IMAGE FORMING APPARATUS, NON-TRANSITORY COMPUTER READABLE RECORDING MEDIUM STORING COLOR CORRECTION CONTROL PROGRAM, AND COLOR CORRECTION CONTROL METHOD IN IMAGE FORMING APPARATUS

(71) Applicant: SHARP KABUSHIKI KAISHA, Sakai (JP)

(72) Inventor: Kenji Itoh, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/512,249

(22) Filed: Oct. 27, 2021

(65) Prior Publication Data
US 2022/0150382 A1 May 12, 2022

(30) Foreign Application Priority Data
Nov. 6, 2020 (JP) .............................. JP2020-185520

(51) Int. Cl.
*H04N 1/60* (2006.01)
*H04N 1/00* (2006.01)

(52) U.S. Cl.
CPC ............ *H04N 1/60* (2013.01); *H04N 1/0044* (2013.01); *H04N 1/00411* (2013.01); *H04N 1/00413* (2013.01); *H04N 1/00482* (2013.01); *H04N 2201/0094* (2013.01)

(58) Field of Classification Search
None
See application file for complete search history.

(56) References Cited

U.S. PATENT DOCUMENTS

| 7,354,123 | B2 | 4/2008 | Otsuki | |
|---|---|---|---|---|
| 2005/0024406 | A1* | 2/2005 | Otsuki | B41J 11/008 347/14 |
| 2012/0212786 | A1* | 8/2012 | Nishiura | H04N 1/00448 358/3.24 |
| 2022/0150382 | A1* | 5/2022 | Itoh | H04N 1/60 |

FOREIGN PATENT DOCUMENTS

JP        2005-324526 A        11/2005

\* cited by examiner

*Primary Examiner* — Frantz Bataille
(74) *Attorney, Agent, or Firm* — ScienBiziP, P.C.

(57) ABSTRACT

A multifunction machine as an image forming apparatus according to the present invention has a color correction function as an auxiliary function of a copying function. According to this color correction function, an expression color of each pixel that constitutes an output image is assigned to any one of color shades in a number of 70. Then, a color correction setting screen in which 70 patches corresponding to the assigned color shades are disposed is displayed on the display. Each of the patches functions as an operator for setting a correction value for density of the corresponding color shade. Then, color correction processing is executed on the basis of a setting content on the color correction setting screen or at an appropriate stage in a process of generating data for printing.

10 Claims, 14 Drawing Sheets

| INPUT (RGB) | OUTPUT (CMYK) |
|---|---|
| ⋮ | ⋮ |

| INPUT (RGB) | OUTPUT (CMYK) | OBJECT AREA | COLOR CATEGORY |
|---|---|---|---|
| ⋮ | ⋮ | ⋮ | ⋮ |

| PIXEL VALUE (CMYK) | COLOR CATEGORY |
|---|---|
| ⋮ | ⋮ |

| COLOR CATEGORY | CORRECTION VALUE |
|---|---|
| ⋮ | ⋮ |

IMAGE FORMING APPARATUS, NON-TRANSITORY COMPUTER READABLE RECORDING MEDIUM STORING COLOR CORRECTION CONTROL PROGRAM, AND COLOR CORRECTION CONTROL METHOD IN IMAGE FORMING APPARATUS

BACKGROUND OF THE INVENTION

Field of the Invention

The present invention relates to an image forming apparatus, a non-transitory computer readable recording medium storing a color correction control program, and a color correction control method in the image forming apparatus, and in particular to an image forming apparatus including an image former for forming a color image based on color image data on an image recording medium, a non-transitory computer readable recording medium storing a color correction control program, and a color correction control method in the image forming apparatus.

Description of the Background Art

Various settings are made in image forming apparatuses such as copiers and printers. For example, Japanese Patent Application Publication No. 2005-324526 discloses a technology for simplifying the setting of saturation, brightness, contrast and the like of an image formed on an image recording medium, that is, a so-called output image (printed image), by using a mark sheet in a printer as an image forming apparatus (printing device).

By the way, in the image forming apparatuses or particularly in the image forming apparatuses capable of forming color images based on color image data, there is a market demand for more detailed adjustment of a color shade (color tone) of the output image and moreover, for the adjustment of the color shade with an easy operation.

Therefore, it is an object of the present invention to provide a new image forming apparatus, a non-transitory computer readable recording medium storing a color correction control program, and a color correction method in the image forming apparatus, which can adjust the color shade of an output image in more detail and which can adjust the color shade with an easy operation.

SUMMARY OF THE INVENTION

In order to achieve this object, the present invention includes a first invention according to an image forming apparatus, a second invention according to a non-transitory computer readable recording medium storing a color correction control program in the image forming apparatus, and a third invention according to a color correction control method in the image forming apparatus.

The first invention according to an image forming apparatus among them is based on a premise that the apparatus includes an image former for forming a color image based on color image data on an image recording medium, and further includes a discriminator, a display, an operation acceptor, and a corrector. The discriminator discriminates which of a plurality of color categories an expression color of each pixel expressed by the image data belongs to. The display displays a representative color that is a representative of an expression color belonging to each of the plurality of color categories. The operation acceptor accepts a user operation. This user operation is to specify any one of the representative colors and to instruct correction of a corresponding component corresponding to the representative color in the image data. The corrector then corrects the image data in accordance with a content of the user operation.

In the first invention, an image forming controller may be further provided. The image forming controller controls the image former to form a list of images illustrating a list of representative colors on an image recording medium. In this case, it is preferable that the display displays the list of representative colors in a state corresponding to the list of images.

In addition, it is preferable that the operation acceptor includes a plurality of operators. These plural operators correspond to the list of representative colors displayed by the display and are capable of individually accepting user operations.

In addition, it is preferable that the display has a display surface on which the list of representative colors is displayed. In this case, it is preferable that the operation acceptor has a touch panel. This touch panel is provided so as to overlap a display surface on which the list of representative colors is displayed, and also constitutes the plurality of operators described above.

Further, the display may display a preview image of the color based on the image data, instead of displaying a list of representative colors. In this case, the display may display a representative color corresponding to a designated spot when a user operation instructing an arbitrary spot in the preview image is accepted by the operation acceptor.

Moreover, according to the first invention, a transmitter may be further provided. The transmitter transmits current status information including a discrimination result by the discriminator and the content of the user operation to an external analysis device when correction by the corrector according to the content of the user operation is not feasible.

When the transmitter as above is provided, an inquirer and a response acceptor may also be provided. The inquirer inquires the user whether or not to transmit the current status information to the analysis device when the correction by the corrector according to the content of the user operation is not feasible. Then, the response acceptor accepts a response offered by the user to an inquiry made by the inquirer. The transmitter then transmits the current status information to the analysis device when a response instructing that the current status information is to be transmitted to the analysis device is accepted by the response acceptor.

The image forming apparatus according to the first invention may be, for example, a multifunction machine (MFP).

A non-transitory computer readable recording medium storing a color correction control program in an image forming apparatus according to the second invention of the present invention causes a computer of the image forming apparatus to perform a discrimination procedure, a display procedure, and a correction procedure. Herein, the image forming apparatus includes an image former and an operation acceptor. The image former forms a color image based on color image data on an image recording medium. The operation acceptor accepts a user operation. Then, in the discrimination procedure, which of a plurality of color categories the expression color of each pixel expressed by the image data belongs to is discriminated. In the display procedure, a representative color that is a representative of an expression color belonging to each of the plurality of color categories is displayed. Then, in the correction procedure, when a predetermined user operation is accepted by the operation acceptor, the image data is corrected in accordance with the content of the user operation. The predetermined user operation is to specify any one of the representative colors and to instruct correction of a corresponding component corresponding to the representative color in the image data.

A color correction method in an image forming apparatus according to a third invention of the present invention includes a discrimination step, a display step, and a correction step. Herein, the image forming apparatus includes an image former and an operation acceptor. The image former forms a color image based on color image data on an image recording medium. The operation acceptor accepts a user operation. Then, in the discrimination step, which of a plurality of color categories the expression color of each pixel expressed by the image data belongs to is discriminated. In the display step, a representative color that is a representative of an expression color belonging to each of the plurality of color categories is displayed. Then, in the correction step, when a predetermined user operation is accepted by the operation acceptor, the image data is corrected in accordance with the content of the user operation. The predetermined user operation is to specify any one of the representative colors and to instruct correction of a corresponding component corresponding to the representative color in the image data.

According to the present invention, the color shade of the output image can be adjusted in more detail, and the color shade can be adjusted with an easy operation.

BRIEF DESCRIPTION OF THE DRAWINGS

FIG. 10 is a diagram conceptually illustrating the configuration of a color conversion table in the first embodiment.

FIG. 11 is a diagram conceptually illustrating the configuration of a correspondence table in the first embodiment.

FIG. 12 is a diagram conceptually illustrating the configuration of a color category table in the first embodiment.

FIG. 13 is a diagram conceptually illustrating the configuration of a color correction table in the first embodiment.

DESCRIPTION OF THE PREFERRED EMBODIMENTS

First Embodiment

Figure 1:
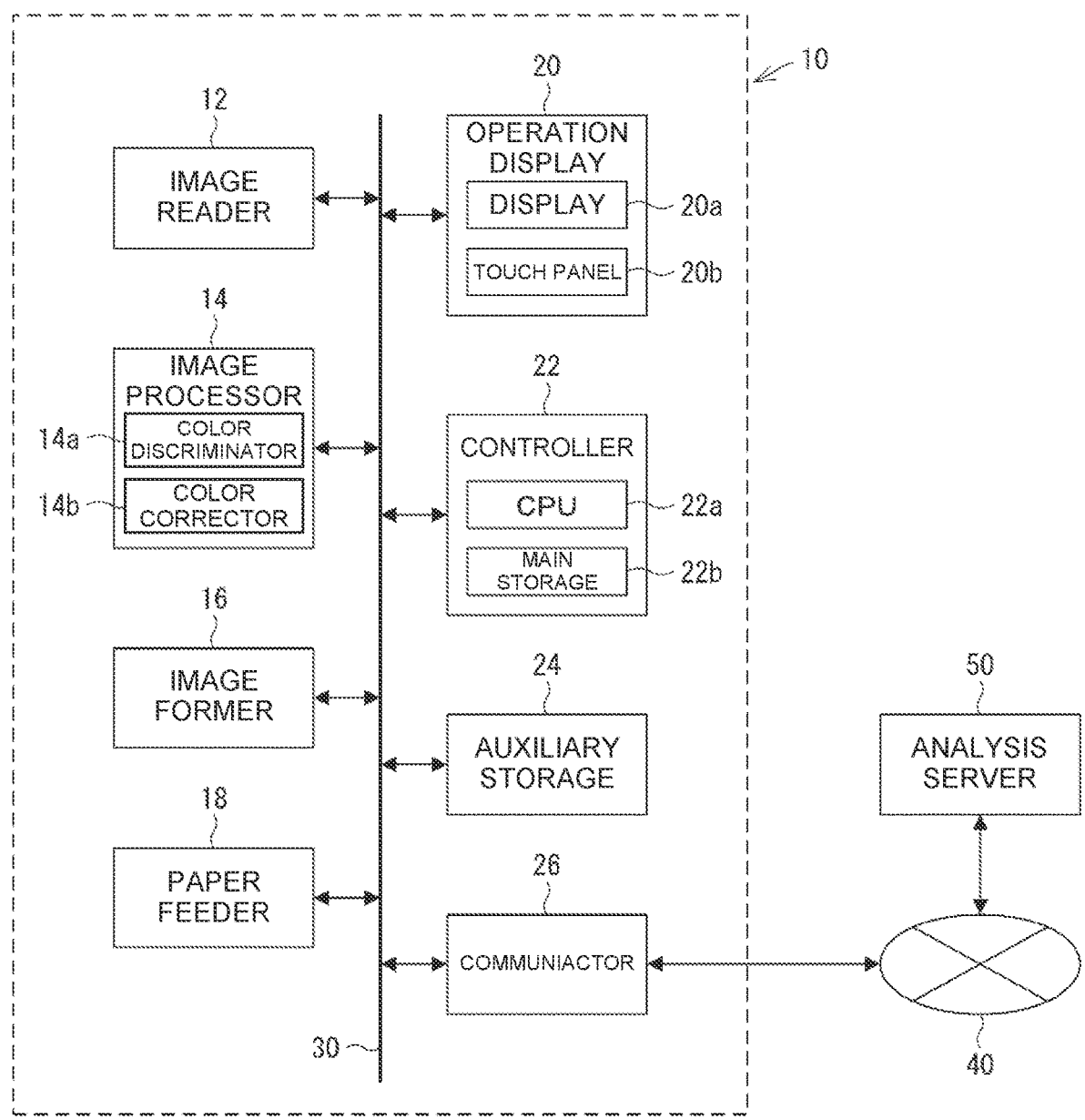
FIG. 1 is a block diagram illustrating an electrical configuration of a multifunction machine according to a first embodiment of the present invention.

A first embodiment of the present invention will be described using a color multifunction machine shown in FIG. 1 (hereinafter simply referred to as "multifunction machine") 10 as an example.

The multifunction machine 10 according to the first embodiment has a plurality of functions, such as a copying function, a printing function, an image scanning function, and a faxing function. Thus, the multifunction machine 10 has an image reader 12, an image processor 14, an image former 16, and a paper feeder 18. The multifunction machine 10 further includes an operation display 20, a controller 22, an auxiliary storage 24, and a communicator 26. They are connected to one another through a common bus 30.

The image reader 12 is an example of an image reader. That is, the image reader 12 is responsible for an image reading processing of reading an image of a manuscript, not shown, and generating two-dimensional read image data corresponding to the read image. In order to realize this image reading processing, the image reader 12 has a manuscript table, not shown, on which the manuscript is placed (set). At the same time, the image reader 12 has an image reading unit including a light source, a mirror, a lens, a line sensor and the like, not shown. Further, the image reader 12 has a drive mechanism, not shown, for moving an image reading position by the image reading unit. In addition, the image reader 12 has a manuscript holder cover, not shown, for holding a manuscript placed on the manuscript table. Moreover, an automatic document feeder (ADF), not shown, which is one of optional devices may be provided in the manuscript holder cover. The read image data is, for example, data in a RGB color space.

The image processor 14 is an example of an image processor. That is, the image processor 14 applies appropriate image processing to various types of image data, such as the read image data described above. The image processing referred to here includes a color space conversion processing for converting image data in the RGB color space into image data in a CMYK color space, and a reticulation processing for converting the image data after the color space conversion processing into data suitable for use in the image forming processing by the image former 16 which will be described next, so to speak, data for printing. In order to realize these types of image processing, the image processor 14 has a processor exclusively for image processing, such as a DSP, not shown. The image processor 14 has a color discriminator 14a and a color corrector 14b. These color discriminator 14a and color corrector 14b will be described in detail later.

The image former 16 is an example of an image former. That is, the image former 16 is responsible for image forming processing of forming, on paper as a sheet-like image recording medium, not shown, an image which is based on appropriate data for printing such as data after the image processing by the image processor 14, that is, printing. The image forming processing is executed by a known electrophotographic method (Carlson process), for example.

Therefore, the image former 16 includes a photosensitive drum, a charging device, an exposing device, a developing device, a transferring device, a fixing device, a cleaning device, a discharging device and the like, not shown. Paper having been subjected to the image forming processing executed by the image former 16, that is, a printed matter is discharged onto a paper discharge tray, not shown. The image former 16 is not limited to the one executing an electrophotographic method, and may be the one executing the image forming processing in accordance with another method, such as an ink jet method.

The paper feeder 18 is an example of a paper feeder. That is, the paper feeder 18 has one or more, for example, a plurality of paper feeding cassettes, not shown. Each of the paper feeding cassettes accommodates paper of an appropriate specified size. In addition, the paper feeder 18 includes one or more, for example, one manual feed tray, not shown. Paper of an appropriate size is set also in this manual feed tray. The paper feeder 18 uses either one of the paper feeding cassettes and the manual feed tray as a paper feed source, and supplies paper from the paper feed source to the image former 16 one by one.

The operation display 20 is a so-called operation panel, and has a display 20a as an example of a screen display and a touch panel 20b as an example of an operation acceptor. The display 20a has a substantially rectangular display surface, and the touch panel 20b is disposed so as to overlap the display surface of the display 20a. Note that the display 20a is, for example, a liquid crystal display (LCD), but it is not limited thereto and may be a display employing another method such as an organic electroluminescent (EL) display. The touch panel 20b is, for example, an electrostatic capacitance type panel, but is not limited thereto, and may be another type of panel, such as an electromagnetic induction type, a resistance film type, and an infrared type. Moreover, the operation display 20 has, in addition to the display 20a, an appropriate light emitter, such as a light-emitting diode (LED), not shown. The operation display 20 further includes, in addition to the touch panel 20b, an appropriate hardware switch such as a push button switch, not shown.

The controller 22 is an example of a controller which is responsible for overall control of the multifunction machine 10. Therefore, the controller 22 has a computer, such as a CPU 22a, as a control executor. In addition, the controller 22 has a main storage 22b as a main storage directly accessible by the CPU 22a. The main storage 22b includes, for example, a ROM and a RAM, not shown.

In the ROM among them, a control program for controlling operations of the CPU 22a, so-called firmware, is stored. The RAM constitutes a work area and a buffer area that are used when the CPU 22a executes processing based on the control programs.

An auxiliary storage 24 is an example of an auxiliary storage. That is, various data such as the above-described read image data and data for printing are stored in the auxiliary storage 24 as appropriate. The auxiliary storage 24 as above has, for example, a hard disk drive, not shown. In addition, the auxiliary storage 24 may have a rewritable non-volatile memory such as a flash memory.

The communicator 26 is an example of a communicator. That is, the communicator 26 is connected to an external device such as an analysis server 50 via a communication network 40, and is responsible for bi-directional communication processing with the external device. The communication network 40 referred to here includes a LAN, the Internet, and a public switched telephone network. Moreover, the LAN includes a wireless LAN, in particular, Wi-Fi (registered trademark). The analysis server 50 is installed in a service center, not shown. This analysis server 50 will be described in detail later.

Now, the multifunction machine 10 according to the first embodiment has a plurality of functions as described above, in particular, a color correction function as one of an auxiliary function of the copying function. According to this color correction function, color shades of an image formed on paper as an image recording medium, that is, an output image can be corrected (adjusted) in detail, and moreover, the correction of the color shades or so-called color correction can be performed with an easy operation.

Figure 2:
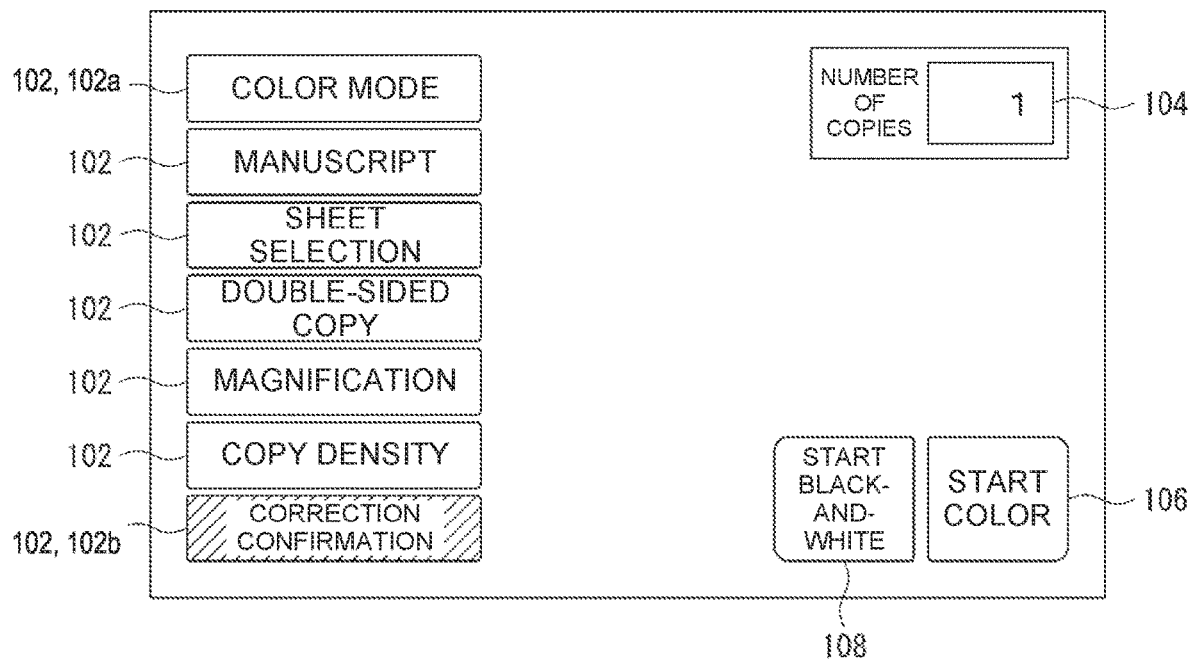
FIG. 2 is a diagram illustrating an example of a copy operation screen in the first embodiment.

Specifically, the multifunction machine 10 has a copy mode, which is an operation mode for realizing the copying function. In the copy mode, a copy operation screen 100, as shown in FIG. 2, is displayed on the display 20a as its basic operation screen.

On a left-side area in this copy operation screen 100, for example, a plurality of setting keys 102, 102, . . . for making various settings are disposed vertically. These setting keys 102, 102, . . . include a "color mode" key 102a to set the color mode, that is, to set which of color copying and black-and-white copying is to be performed. In addition, each of the setting keys 102, 102, . . . includes a "correction confirmation" key 102b for enabling or disabling (ON/OFF) the color correction function.

Moreover, a field 104 for setting the number of copies (printing) is disposed near an upper right corner in the copy operation screen 100. In addition, a "color start" key 106 for instructing start of the color copying and a "black-and-white start" key 108 for instructing the start of the black-and-white copying are disposed horizontally near a lower right corner in the copy operation screen 100. It is to be noted that elements (widgets) other than that are disposed in the copy operation screen 100 as appropriate, but description, including illustration thereof, is omitted for elements that are not directly related to the main idea of the present invention.

In the copy operation screen 100 as above, when the "correction confirmation" key 102b is operated (pressed), the color correction function is enabled or disabled as described above, or each time the "correction confirmation" key 102b is operated in more detail, enabling and disabling of the color correction function is alternately switched. Moreover, a display style of the "correction confirmation" key 102b changes depending on which of the enabled state and the disabled state the color correction function is in. For example, when the color correction function is in the enabled state, the "correction confirmation" key 102b is marked with an appropriate color. Accordingly, a user who uses the multifunction machine 10 can intuitively recognize whether the color correction function is in the enabled state or in the disabled state from the display style of the "correction confirmation" key 102b. It is to be noted that FIG. 2 shows a state in which an appropriate color is given to the "correction confirmation" key 102b, that is, the state in which the color correction function is enabled.

Figure 3:
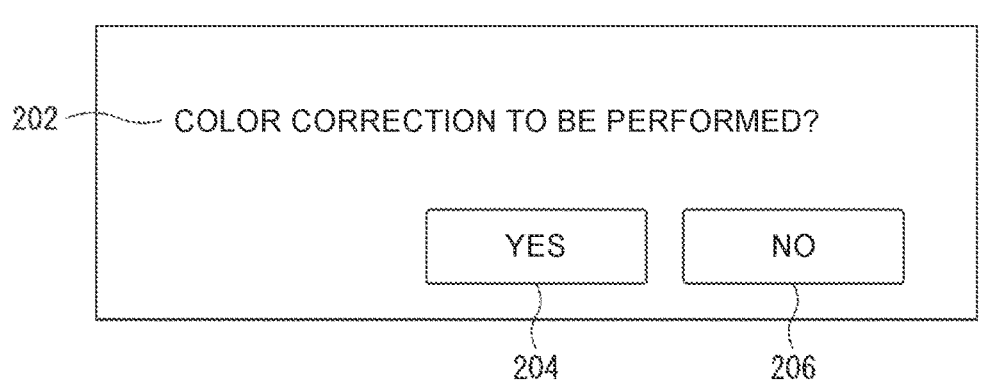
FIG. 3 is a diagram illustrating a color correction necessity confirmation screen in the first embodiment.

In the state where the color correction function is enabled as shown in FIG. 2, suppose that a color manuscript is placed on the manuscript table of the image reader 12. In addition, the color copying is selected as the color mode (or the color mode is set to be selected automatically) by operating the "color mode" key 102a. Moreover, suppose that an arbitrary number of copies is set (input) in the field 104. Then, suppose that the "color start" key 106 is operated. Then, copy processing including a combination of image reading processing by the image reader 12, image processing by the image processor 14, and image forming processing by the image former 16 is performed for only one copy. As a result, only one copy of the printed matter, which is a copy of the image on the manuscript is output. Then, a color correction necessity confirmation screen 200 as shown in FIG. 3 is displayed on the display 20*a*. It is to be noted that the color correction necessity confirmation screen 200 is a small screen (pop-up screen) displayed on the copy operation screen 100, and is a modal dialog in a strict meaning.

In this color correction necessity confirmation screen 200, an appropriate character string 202 inquiring the user whether or not the color correction is to be performed is disposed at a position closer to the left in the upper part thereof, for example. Two operation keys 204 and 206 are disposed horizontally below the character string 202, or slightly closer to the right in more detail. The operation key 204 on the left side of these two operation keys 204 and 206 is a "Yes" key for instructing that the color correction is to be performed. And the operation key 206 on the right side is a "No" key for indicating that the color correction is not to be performed.

In the color correction necessity confirmation screen 200 as above, suppose that the "No" key 206 is operated, for example. Then, the color correction necessity confirmation screen 200 disappears. Then, if the number of copies set on the copy operation screen 100 (field 104) is plural, for example, the copy processing is executed for the remaining number of copies, or strictly speaking, the image forming processing by the image former 16 is executed. While the image forming processing for the remaining number of copies is being executed, that is, during printing, a printing-in-progress screen, not shown, indicating that the printing is in progress is displayed on the display 20*a*. When the printing for the remaining number of copies is finished, a copy end screen, not shown, is displayed on the display 20*a* instead of the printing-in-progress screen. This copy end screen is displayed for a certain period of time (for several seconds, for example), after which the display returns to a state in which the copy operation screen 100 is displayed on the display 20*a*. If the set number of copies is only one, the copy end screen is displayed on the display 20*a* for a certain period of time (without printing of the remaining number of copies), and then the display 20*a* returns to the state in which the copy operation screen 100 is displayed thereon.

Figure 4:
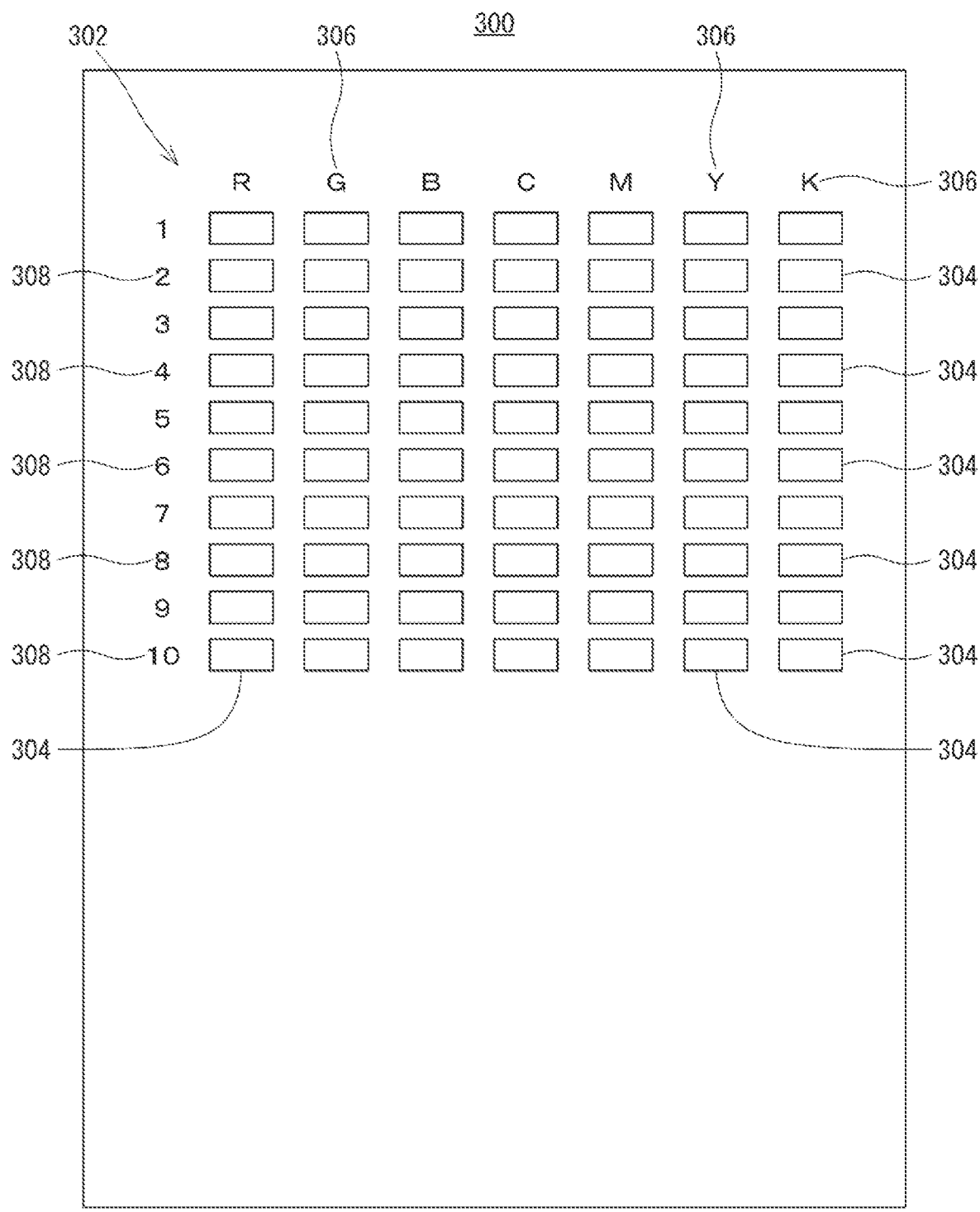
FIG. 4 is a diagram illustrating an example of a color composition sheet in the first embodiment.

In contrast, when the "Yes" key 204 on the color correction necessity confirmation screen 200 is operated, a color composition sheet 300 as shown in FIG. 4 is output as a printed matter. In addition, a color correction setting screen 400 (see FIG. 6) described below is displayed on the display 20*a* instead of the color correction necessity confirmation screen 200.

The color composition sheet 300 represents a list 302 of colors, that is, expression colors, of each of pixels constituting the output image based on a manuscript image, and strictly speaking, represents a list of representative colors which are representatives of the expression colors. To explain in more detail, the expression color of each of the pixels constituting an output image is assigned to one of seven color systems, for example, R (red) system, G (green) system, B (blue) system, C (cyan) system, M (magenta) system, Y (yellow) system, and K (black) system, from a visual (appearance) viewpoint and is assigned to one of 10 types (color types) that differ in three attributes (hue, saturation, and lightness) by each of the systems. In other words, the expression color of each of the pixels constituting the output image is assigned to any one of color shades in the number of 70 (=7×10). It is to be noted that the R, G, and B color systems referred to here are only color shades from a visual viewpoint as described above and are elements of a concept different from each of R, G, and B color components in the RGB color space, for example. Moreover, the C, M, Y, and K color systems referred to here also mean only color shades from the visual viewpoint and are elements of a concept different from each of the C, M, Y, and K color components in the CMYK color space, for example.

A result of assignment of the expression color of each of the pixels constituting the output image as above is expressed in the color composition sheet 300 as the list 302. In this list 302, each color shade is arranged by the color system in a horizontal direction (left-right direction in FIG. 4), or rectangular patches 304, 304, . . . of each color shade are arranged in more detail. Then, each of the patches 304, 304, . . . is arranged by the color type in a vertical direction (up-and-down direction in FIG. 4). In addition, at a top of the list 302, appropriate characters representing each color system, that is, characters 306, 306, . . . such as "R", "G", "B", "C", "M", "Y" and "K", for example, are arranged. Then, appropriate characters representing each color type, that is, characters 308, 308, . . . representing numerical values (integers) from "1" to "10", for example, are arranged in a left-side portion of the list 302.

Figure 5:
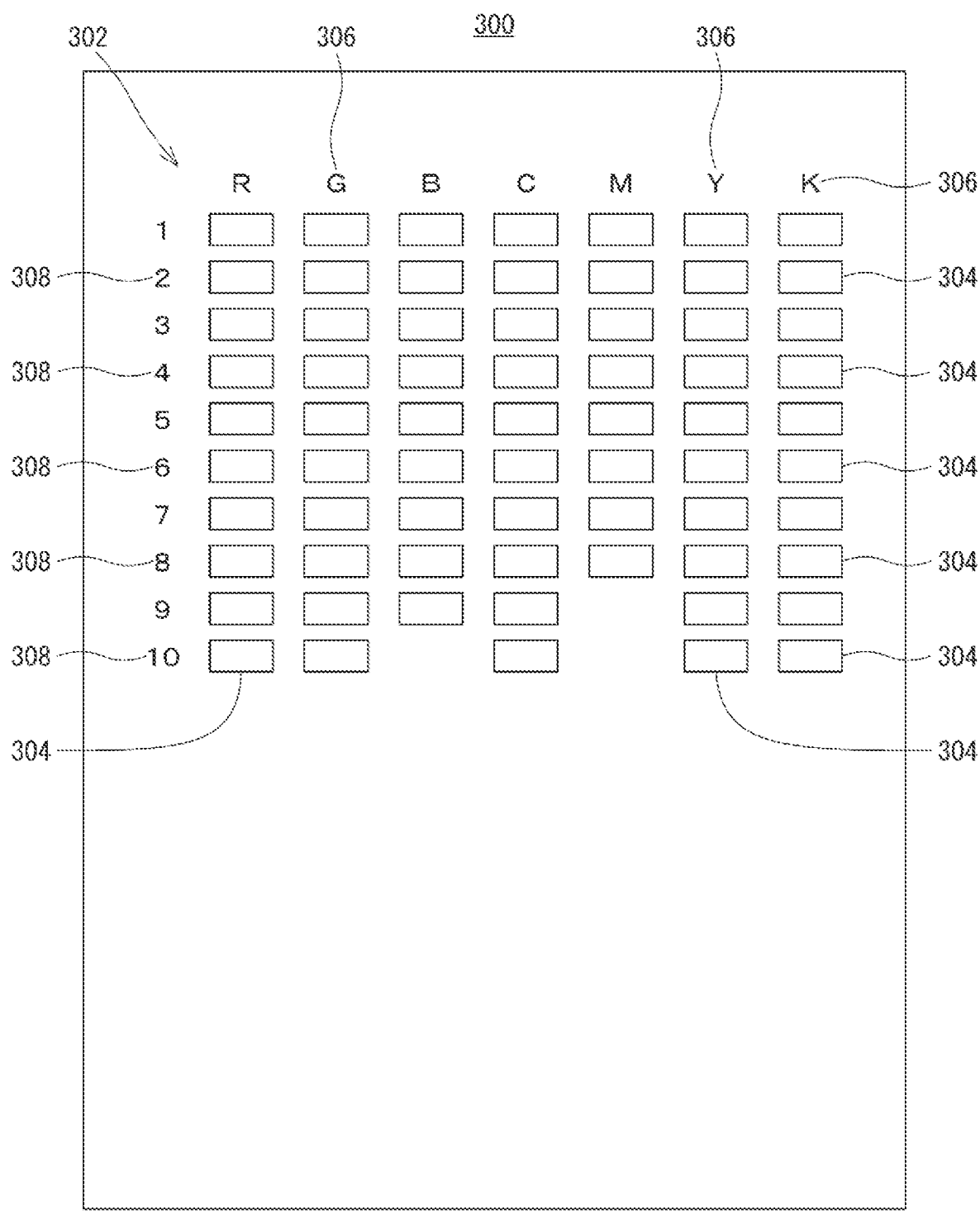
FIG. 5 is a diagram illustrating another example of the color composition sheet in the first embodiment.

It is to be noted that some output images may have a bias in their overall color shades. In such a case, the color composition sheet 300 as shown in FIG. 5 may be output, for example. This color composition sheet 300 shown in FIG. 5 is an example of an output image with a fewer color shades in the B and M systems. That is, in the color composition sheet 300 shown in FIG. 5, the number of patches 304, 304, . . . in the B system is 9 smaller than 10, and the number of patches 304, 304, . . . in the M system is 8 smaller than 10, that is, it is the list 302 for such output image.

Moreover, the color composition sheet 300 is composed of paper of the same specification as that on which the output image is formed and is composed by forming an image of the list 302 on paper supplied from the same paper feed source (paper feeder 18) as that at the time of formation of the output image, for example. Thus, the list 302 represented by the color composition sheet 300 precisely reflects the color shades (in a representative color in a strict sense) of the output image.

Figure 6:
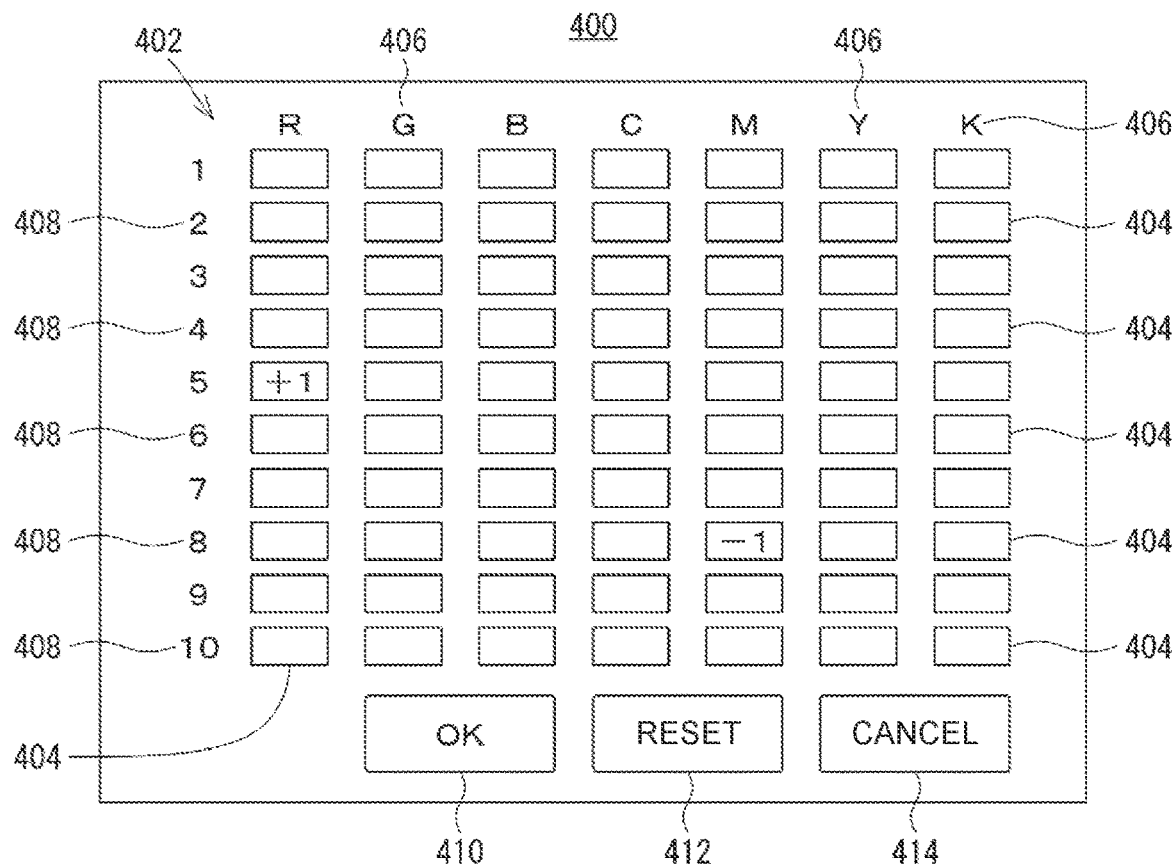
FIG. 6 is a diagram illustrating an example of a color correction setting screen in the first embodiment.

In addition to the output of this color composition sheet 300, the color correction setting screen 400 as shown in FIG. 6 is displayed on the display 20*a*. This color correction setting screen 400 is a modal dialog, for example.

In this color correction setting screen 400, a list 402 similar to that in the color composition sheet 300 is arranged. That is, in the list 402, patches 404, 404, . . . similar to those in the color composition sheet 300 are arranged by the color system in the horizontal direction (left-right direction in FIG. 5) and by the color type in the vertical direction (up-down direction in FIG. 5). Moreover, at a top of the list 402, appropriate characters representing each color system, that is, characters 406, 406, . . . such as "R", "G", "B", "C", "M", "Y" and "K", for example, are arranged. In addition, appropriate characters representing each color type, that is, characters 408, 408, . . . representing numerical values from "1" to "10", for example, are arranged in the left-side portion of the list 402. It is to be noted that, even if the total number of patches 304, 304, . . . in the color composition sheet 300 is smaller than 70 as shown in FIG. 5, for example, due to a bias in the color shades of the output image, the total number of patches 404, 404, . . . in the color correction setting screen 400 is 70 all the time.

Each of the patches 404, 404, . . . in the color correction setting screen 400 as above corresponds to each of the patches 304, 304, . . . in the color composition sheet 300, that is, it is the same color shade as each of the patches 304, 304, . . . in the color composition sheet 300. Strictly speaking, however, each of the patches 404, 404, . . . in the color correction setting screen 400 is expressed in the RGB color space, while each of the patches 304, 304, . . . in the color composition sheet 300 is expressed in the CMYK color space and thus, the color shades of the both are not totally the same but somewhat (finely) different.

Moreover, each of the patches 404, 404, . . . in the color correction setting screen 400 serves as an operator for setting a correction value for the density of the color shade corresponding to each of them. For example, each time an arbitrary patch 404 is operated, the correction value of the density of the corresponding color shade changes in a rotary manner, such as "+1"→"+2"→"−2"→"−1"→"0". The larger this correction value is, the higher (darker) the density becomes, and the smaller this correction value is, the lower (lighter) the density becomes. In addition, regarding the patch 404 corresponding to the color shade for which a correction value other than "0" is set, a character string representing the correction value is given. It is to be noted that FIG. 6 shows an example in which a correction value of "+1" is set for the color shade of a number 5 in the R system and a correction value of "−1" is set for the color shade of a number 8 in the M system. However, when the color correction setting screen 400 is first displayed, the correction value for any color shade is "0", that is, the correction value has not been set.

In addition, three operation keys 410, 412 and 414 are disposed horizontally at a lower part of the color correction setting screen 400 or at a slightly rightward position, strictly speaking. Among these three operation keys 410, 412 and 414, the leftmost operation key 410 is an "OK" key for instructing that the setting contents in the color correction setting screen 400 are to be confirmed. And the center operation key 412 is a "Reset" key for instructing to return the color correction setting screen 400 to an initial state in which the color correction setting screen 400 is displayed. And the rightmost operation key 414 is a "Cancel" key for instructing to cancel the color correction setting by the color correction setting screen 400.

In this color correction setting screen 400, suppose that the "Reset" key 412 is operated, for example. Then, the screen returns to the initial state in which the color correction setting screen 400 is displayed, that is, a correction value is set for none of the color shades.

Moreover, in the color correction setting screen 400, when the "Cancel" key 414 is operated, the color correction setting screen 400 disappears. Then, the color correction necessity confirmation screen 200 is displayed again on the display 20a.

Furthermore, suppose that the "OK" key 410 is operated in a state in which a correction value other than "0" is not set for any of the color shades in the color correction setting screen 400. Then, the color correction setting screen 400 disappears. Then, a message screen, not shown, indicating that no correction value has been set for any of the color shades is displayed on the display 20a for a certain period of time (for several seconds, for example). After that, the color correction necessity confirmation screen 200 is displayed again on the display 20a.

In addition, suppose that a correction value other than "0" is set for an arbitrary color shade in the color correction setting screen 400, and then the "OK" key 410 is operated. Then, the color correction setting screen 400 disappears. Then, the correction values set on the color correction setting screen 400 are finalized, and the correction values are stored in a color correction table 756d (see FIG. 13), which will be described in detail later. In addition, such simulation on whether color correction according to the finalized correction values is possible is conducted.

Figure 7:
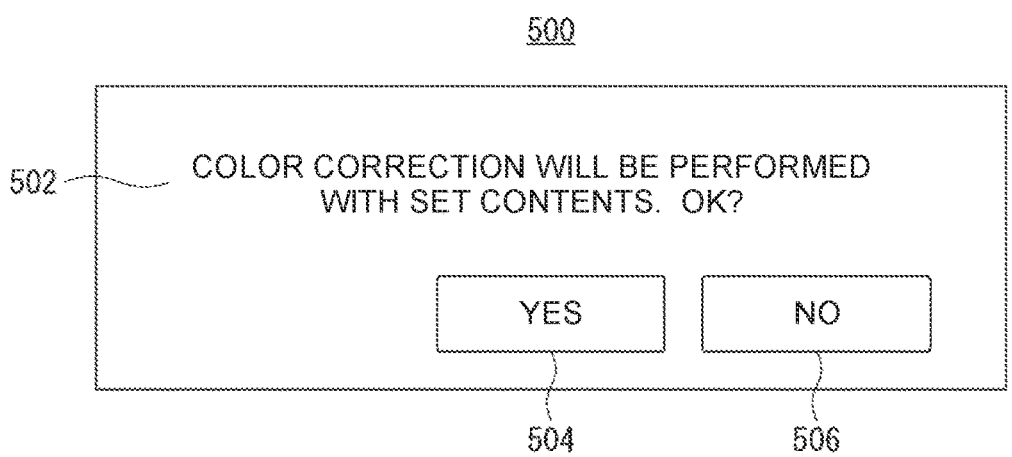
FIG. 7 is a diagram illustrating a color correction execution confirmation screen in the first embodiment.
Figure 8:
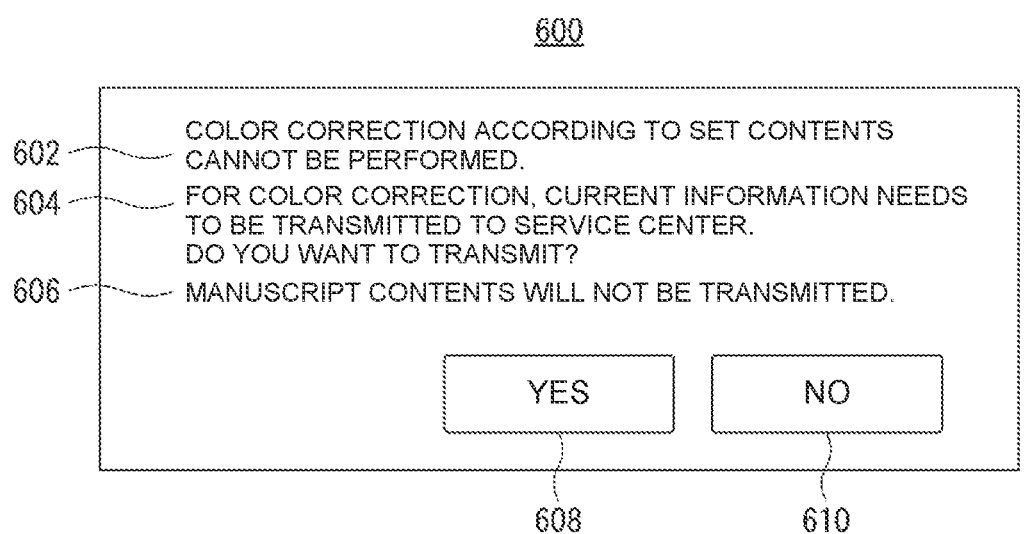
FIG. 8 is a diagram illustrating a center notification confirmation screen in the first embodiment.

If it is determined that the color correction is possible, for example, as a result of this simulation, a color correction execution confirmation screen 500 as shown in FIG. 7 is displayed on the display 20a. On the other hand, if it is determined that the color correction is impossible, a center notification confirmation screen 600 as shown in FIG. 8 is displayed on the display 20a. It is to be noted that a case in which the color correction is impossible is the one in which, for example, color correction of one color shade results in extreme changes to other color shades that are not subjected to the color correction. This applies particularly to a case in which a relatively large amount of color correction is performed on multiple color shades, and a mutual relationship (hue and the like) of each of the color shades subjected to the color correction is extremely different.

The color correction execution confirmation screen 500 shown in FIG. 7 is, for example, a modal dialog. In this color correction execution confirmation screen 500, an appropriate character string 502 is disposed at the upper left of the screen to ask the user whether or not to perform color correction based on the content set (finalized) in the color correction setting screen 400 described above. And two operation keys 504 and 506 are arranged horizontally below the character string 502 or slightly to the right in more detail. The operation key 504 on the left side of these two operation keys 504 and 506 is the "Yes" key for instructing that the color correction is to be performed. And the operation key 506 on the right side is the "No" key for instructing that no color correction is to be performed.

In this color correction execution confirmation screen 500, suppose that the "No" key 506 is operated, for example. Then, the color correction execution confirmation screen 500 disappears. Then, the color correction necessity confirmation screen 200 is displayed again on the display 20a.

In contrast, when the "Yes" key 504 in the color correction execution confirmation screen 500 is operated, the color correction execution confirmation screen 500 disappears. Then, the color corrector 14b of the image processor 14 is enabled. The color corrector 14b executes color correction processing in accordance with the setting contents on the color correction setting screen 400 for data for printing or at an appropriate stage in a process of generating the data for printing. Then, on the basis of the data for printing after the color correction processing by the color corrector 14b, that is, the data after the color correction, the image forming processing by the image former 16 is executed for all the copies. While the image forming processing for all these copies is being performed, that is, during printing, the above-described printing-in-progress screen is displayed on the display 20a. When the printing of all the copies is completed, the above-described copy end screen is displayed on the display 20a for a certain period of time (for several seconds, for example) instead of the printing-in-progress screen. Thereafter, the copy end screen disappears and a state in which the copy operation screen 100 is displayed on the display 20a is returned.

Meanwhile, the center notification confirmation screen 600 shown in FIG. 8 is also a modal dialog. In this center notification confirmation screen 600, an appropriate character string 602 indicating that color correction cannot be performed with the contents set on the color correction setting screen 400 is disposed at a position close to the left of the upper part thereof, for example. Below the character string 602, another character string 604 is disposed, indicating that current information needs to be transmitted to the service center in order to perform color correction and inquiring the user whether the information may be transmitted to the service center or not. In addition, still another character string 606 is disposed below the character string 604 indicating that the contents of the manuscript will not be transmitted (to the service center). In addition, two operation keys 608 and 610 are arranged horizontally below the character string 606 or slightly to the right in more detail. The operation key 608 on the left side of these two operation keys 608 and 610 is the "Yes" key for instructing that the current information is to be transmitted to the service center. And the operation key 610 on the right side is the "No" key instructing that the current information is not to be transmitted to the service center.

In this center notification confirmation screen 600, suppose that the "Yes" key 608 is operated, for example. Then, the center notification confirmation screen 600 disappears. The current information, that is, the information on current status including the contents of a correspondence table 756b (see FIG. 11) and the color correction table 756d (see FIG. 13), which will be described below in detail, is then transmitted to the service center or to the analysis server 50 in more detail. The analysis server 50 analyzes the received current status information and derives action information, such as a color profile, to realize color correction according to the current status information, that is, color correction according to the setting contents on the color correction setting screen 400. The analysis server 50 then feeds back the derived color profile to the multifunction machine 10. By using this color profile, the multifunction machine 10 can perform color correction that was impossible with the setting contents on the color correction setting screen 400. It is to be noted that data containing the content (image) of the manuscript itself, such as read image data and data for printing, is not transmitted to the service center (analysis server 50) and thus, information security is ensured. During the period from the time when the current status information is transmitted to the analysis server 50 until the time when it is confirmed on the multifunction machine 10 side that the current status information has been received by the analysis server 50, a communication-in-progress screen, not shown, is displayed on the display 20a.

After the current status information is transmitted to the service center in this manner, a subsequent processing depends on whether there are any remaining copies that have not been printed, that is, whether the number of copies set on the copy operation screen 100 (field 104) is plural or not. This also applies when the "No" key 610 in the center notification confirmation screen 600 is operated. That is, when the "No" key 610 in the center notification confirmation screen 600 is operated, the center notification confirmation screen 600 disappears. After this, the processing changes depending on whether there are any remaining copies that have not been printed, that is, whether the set number of copies is plural or not.

For example, if the set number of copies is only one, that is, if there are no remaining copies that have not been printed, the copy end screen described above is displayed on the display 20a for a certain period of time. Thereafter, the copy end screen disappears and a state in which the copy operation screen 100 is displayed on the display 20a is returned.

On the other hand, if the set number of copies is plural, that is, if there are a remaining number of copies that have not been printed, the remaining number of copies print confirmation screen, not shown, is displayed on the display 20a. This remaining number of copies print confirmation screen is a modal dialog with a "Yes" key and a "No" key disposed. When the "Yes" key on this remaining number of copies print confirmation screen is operated, printing of the remaining number of copies is started. When the printing of the remaining number of copies is completed, the copy end screen described above is displayed on the display 20a for a certain period of time and then, the state in which the copy operation screen 100 is displayed on the display 20a is returned. If the "No" key on the remaining number of copies print confirmation screen is operated, printing of the remaining number of copies is not performed, and after the copy end screen described above is displayed on the display 20a for a certain period of time, the state in which the copy operation screen 100 is displayed on the display 20a is returned.

Figure 9:
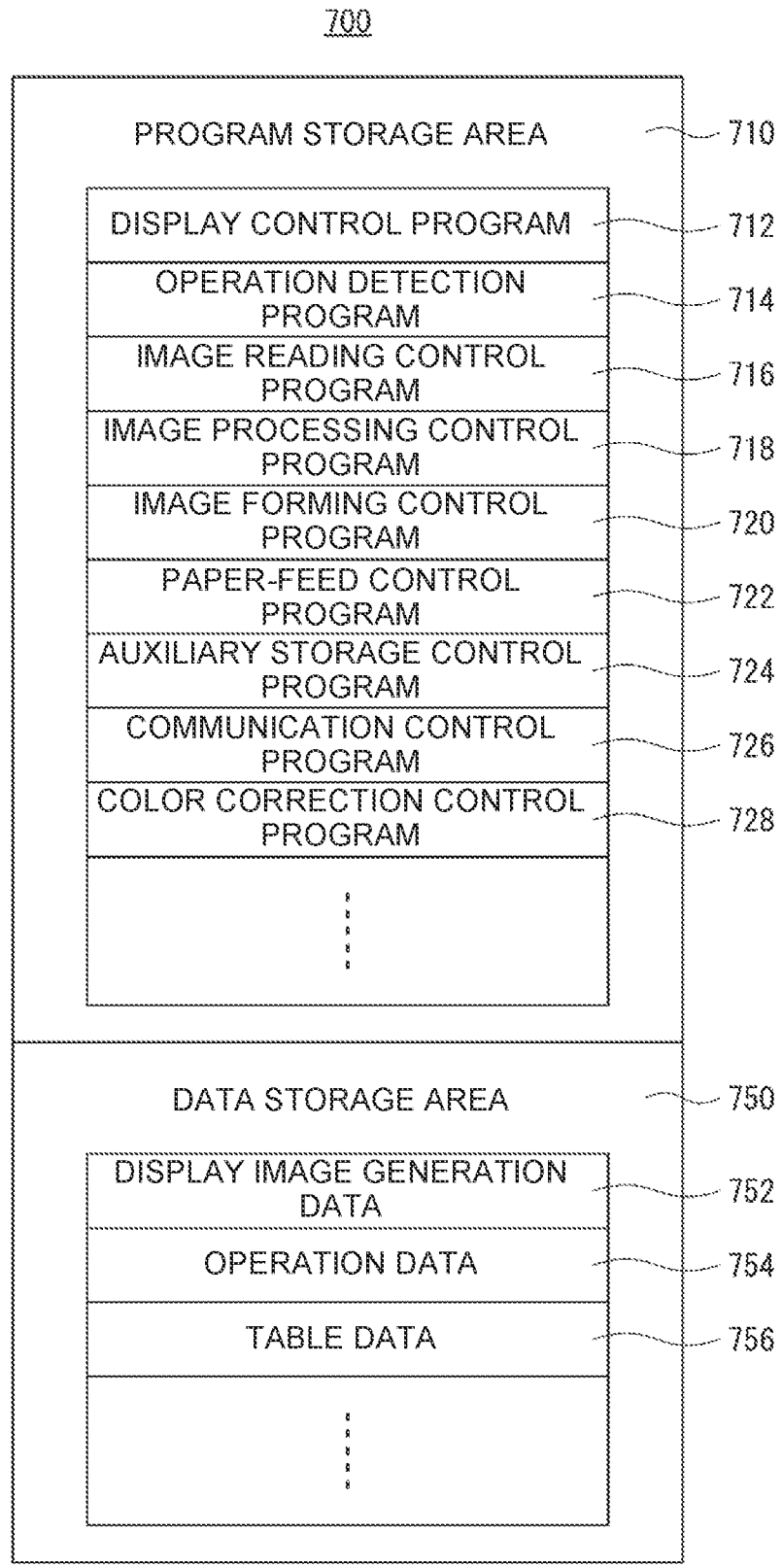
FIG. 9 is a memory map conceptually illustrating a configuration in a RAM of a main storage in the first embodiment.
Figure 14:
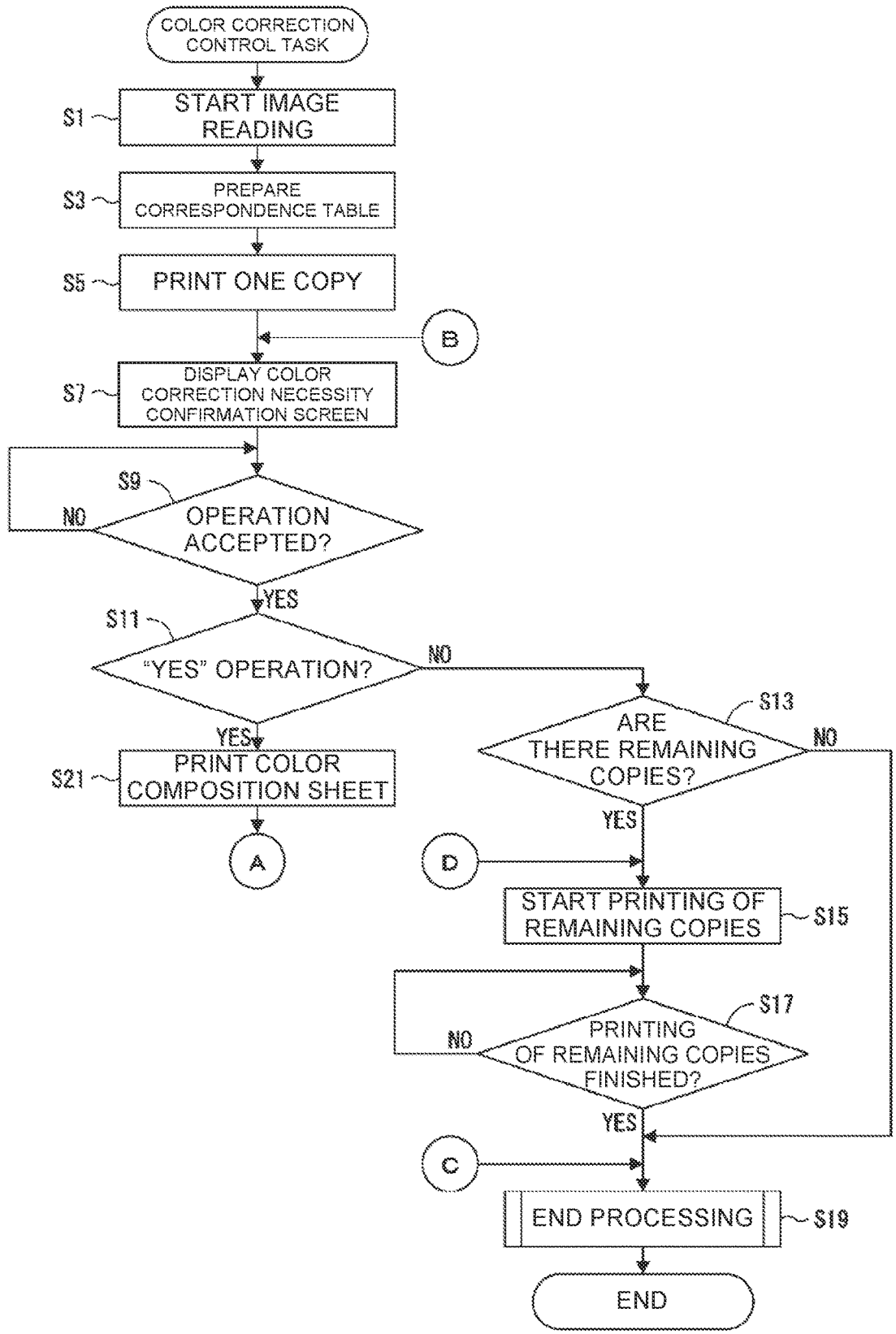
FIG. 14 is a flowchart illustrating a flow of a part of a color correction control task in the first embodiment.
Figure 15:
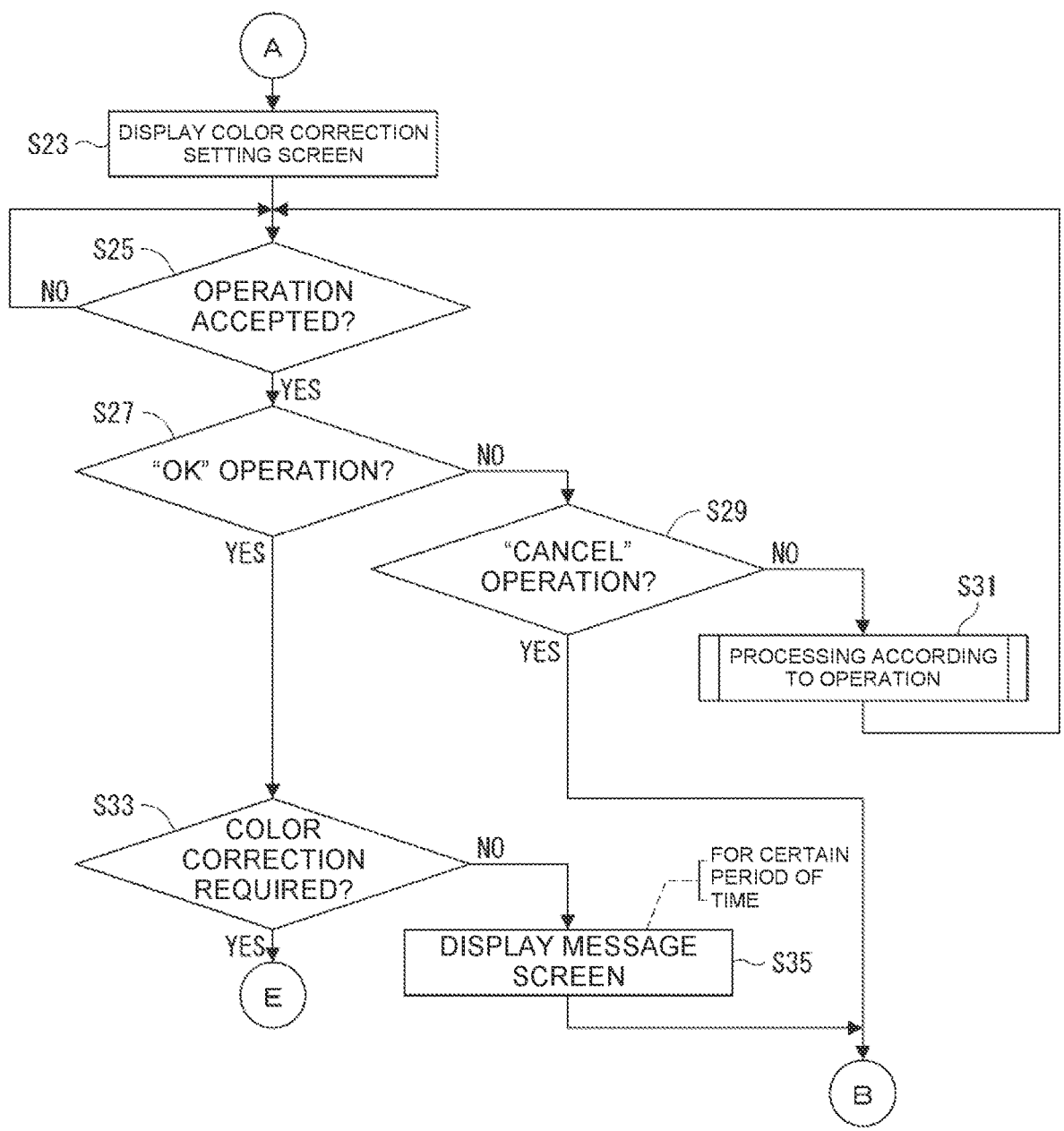
FIG. 15 is a flowchart illustrating the flow of another part of the color correction control task in the first embodiment.
Figure 16:
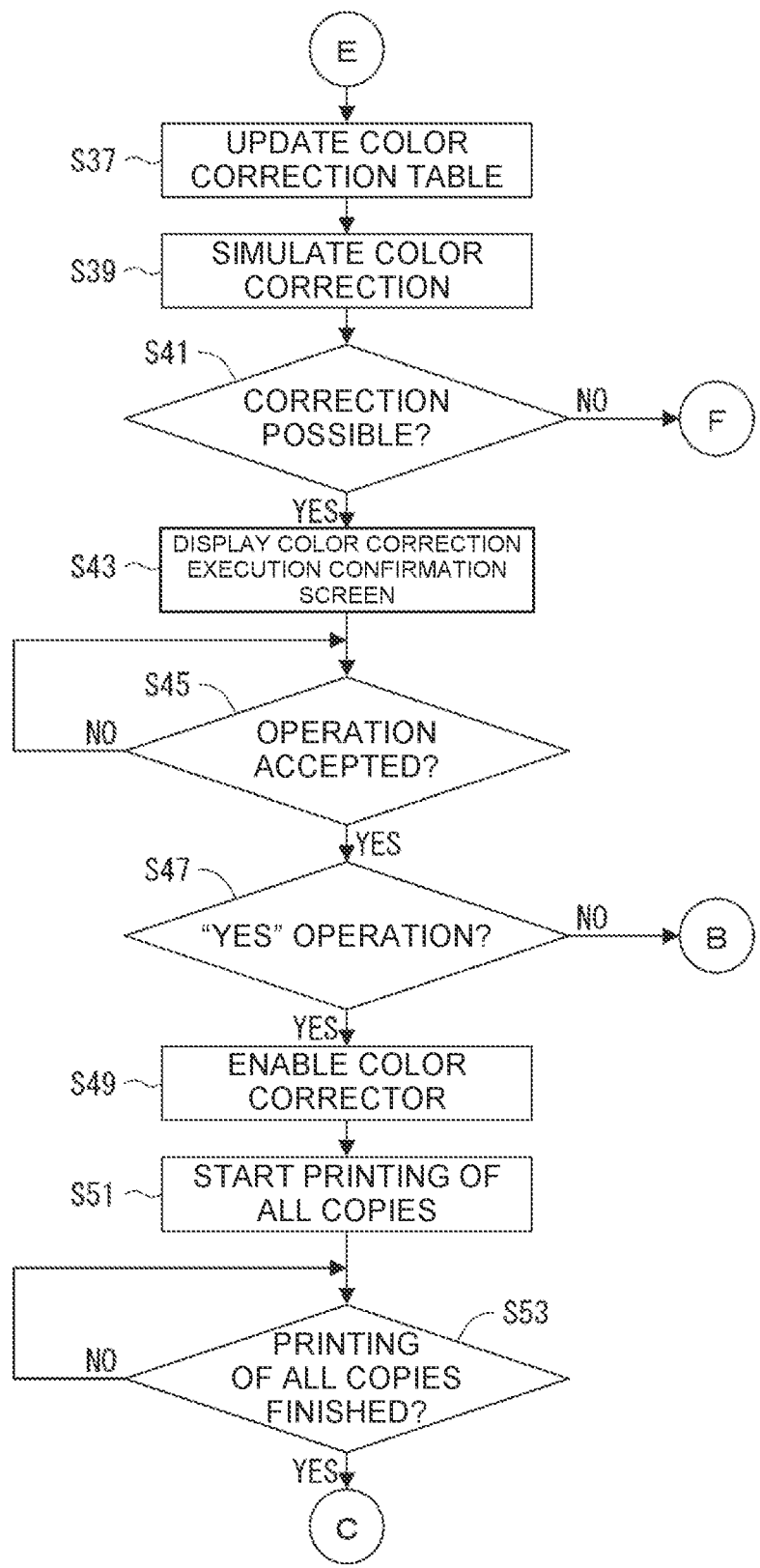
FIG. 16 is a flowchart illustrating the flow of still another part of the color correction control task in the first embodiment.
Figure 17:
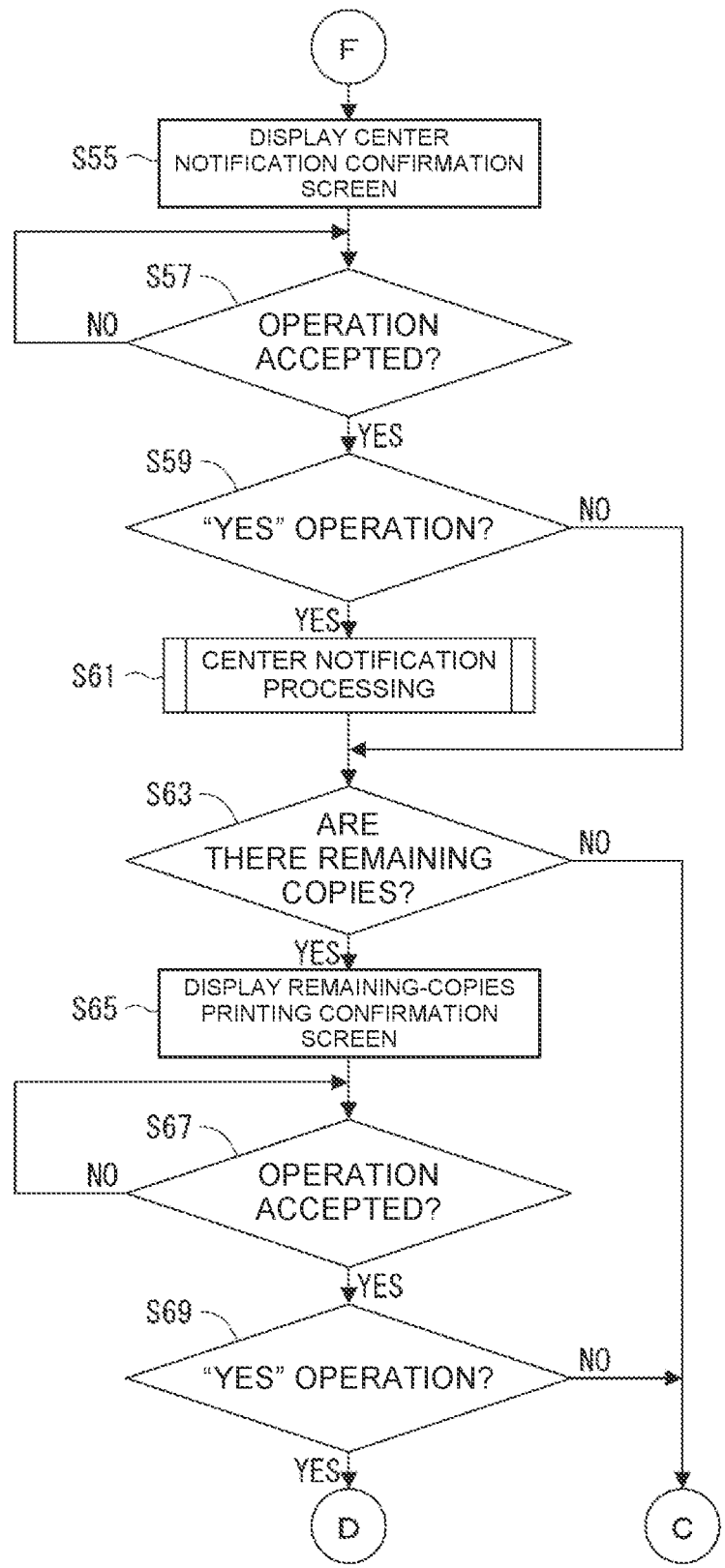
FIG. 17 is a flowchart illustrating the flow of the rest of the color correction control task in the first embodiment.

Here, FIG. 9 shows a memory map 700 conceptually illustrating a configuration in the RAM of the main storage 22b.

As shown in this memory map 700, the RAM has a program storage area 710 and a data storage area 750. In the program storage area 710 in them, the above-described control program is stored. Specifically, the control program includes a display control program 712, an operation detection program 714, an image reading control program 716, an image processing control program 718, an image forming control program 720, a paper-feed control program 722, an auxiliary storage control program 724, and a communication control program 726. In addition, the control program also includes a color correction control program 728.

The display control program 712 is a program for generating display screen data required for displaying various screens, including the copy operation screen 100, on the display 20a. The operation detection program 74 is a program for detecting an operation state to the touch panel 20b. The image reading control program 716 is a program for controlling the image reader 12. The image processing control program 718 is a program for controlling the image processor 14. The image forming control program 720 is a program for controlling the image former 16. The paper-feed control program 722 is a program for controlling the paper feeder 18. The auxiliary storage control program 724 is a program for controlling the auxiliary storage 24. The communication control program 726 is a program for controlling the communicator 26. And the color correction control program 728 is a program for causing the CPU 22a to execute a color correction control task described below.

Meanwhile, various types of data are stored in the data storage area 750. The various types of data stored in this data storage area 750 include display image generation data 752, operation data 754, table data 756, and the like.

The display image generation data 752 is data such as polygon data and texture data used for generating display screen data based on the above-described display control program 712. The operation data 754 is data representing the operation state to the touch panel 20b, or is time-series data representing the user's touch position (coordinates) with respect to the touch panel 20b in more detail. The table data 756 includes various tables, including, among others, a color conversion table 756a shown in FIG. 10, the correspondence table 756b shown in FIG. 11, a color category table 756c shown in FIG. 12, and the color correction table 756d shown in FIG. 13.

For example, the color conversion table 756a shown in FIG. 10 is a look-up table for converting (color conversion) image data in the RGB color space, such as read image data input to the image processor 14, into image data in the CMYK color space when generating data for printing by the image processor 14. This color conversion table 756a is incorporated into the control program in advance at the time of shipment from the factory, for example.

The correspondence table 756b shown in FIG. 11 is a table for storing the correspondence on what pixel values in the CMYK color space each of the pixel values of the image data in the RGB color space actually input to the image processor 14 was converted to when generating data for printing by the image processor 14. A procedure for converting RGB color space pixel values to CMYK color space pixel values depends on what type of the object area (text area, photographic area, graphic area and the like) the pixel to be converted constitutes. Accordingly, for each pixel, what type of the object area the pixel constitutes is also stored in the correspondence table 756b. Furthermore, the converted pixel values are assigned to one of the 70 color categories corresponding to the color shades in the above-described number of 70, and the results of this assignment are also stored in the correspondence table 756b. This assignment is performed by the color discriminator 14a. Then, the color category table 756c shown in FIG. 12 is provided to realize the assignment by the color discriminator 14a.

In other words, the color category table 756c shown in FIG. 12 is a look-up table that summarizes the relationship of all pixel values that can be taken as pixel values in the CMYK color space after conversion by the image processor 14 on which color category each of them belongs to. This color category table 756c, similarly to the color conversion table 756a, is also incorporated into the control program in advance at the time of shipment from the factory, for example.

The color discriminator 14a discriminates to which color category the respective pixel values after conversion by the image processor 14 belong by referring to the color category table 756c. This discrimination result (color category) by the color discriminator 14a is stored in the correspondence table 756b. Then, the above-described color composition sheet 300 is output on the basis of the contents of the correspondence table 756b.

The color correction table 756d shown in FIG. 13 is a table for storing the setting contents made on the color correction setting screen 400. In other words, when a correction value other than "0" is set for an arbitrary color shade on the color correction setting screen 400, or strictly speaking, when the correction value is finalized, the finalized content is stored in the color correction table 756d. The color correction processing by the color corrector 14b is executed on the basis of the contents of this color correction table 756d.

As described above, the CPU 22a operates in accordance with the control program, and among other things, the color correction function is realized by executing the color correction control task in accordance with the color correction control program 728. The flow of this color correction control task is shown in FIG. 14 to FIG. 17. It is to be noted that the CPU 22a executes the color correction control task in response to the operation of the "color start" key 106 in the copy operation screen 100 in a state where the color correction function is enabled.

According to this color correction control task, first, at step S1, the CPU 22a controls the image reader 12 so that the image reading processing by the image reader 12 is started. Incidentally, the CPU 22a controls the image processor 14 so that image processing for generating data for printing by the image processor 14 is started. Then, the CPU 22a advances the processing to step S3.

At step S3, the CPU 22a prepares the correspondence table 756b in accordance with progress of the image processing by the image processor 14. In other words, the CPU 22a stores in the correspondence table 756b a correspondence on what CMYK color space pixel values each of the pixel values of the read image data in the RGB color space was converted to. In addition, the CPU 22a stores in the correspondence table 756b what kind of an object area each pixel of the read image data constitutes. Moreover, the CPU 22a stores in the correspondence table 756b which color category each of the pixel values after conversion belongs to. Then, the CPU 22a advances the processing to step S5.

At step S5, the CPU 22a controls the image former 16 so that the image forming processing by the image former 16, that is, printing, is performed only for one copy on the basis of the data for printing generated by the image processor 14. As a result, only one copy of the printed matter based on the data for printing is output. Then, the CPU 22a advances the processing to step S7.

At step S7, the CPU 22a displays the color correction necessity confirmation screen 200 on the display 20a. Then, the CPU 22a advances the processing to step S9.

At step S9, the CPU 22a waits for the color correction necessity confirmation screen 200 to accept some operation (S9: NO). When the color correction necessity confirmation screen 200 accepts some operation (S9: YES), the CPU 22a advances the processing to step S11.

At step S11, the CPU 22a determines whether the operation accepted at step S9 is an operation of the "Yes" key 204 in the color correction necessity confirmation screen 200 or not. Here, for example, if the operation accepted at step S9 is the operation of the "Yes" key 204 (S11: YES), the CPU 22a advances the processing to step S21 described below. On the other hand, if the operation accepted at step S9 is not the operation of the "Yes" key 204, that is, if the operation accepted at step S9 is the operation of the "No" key 206 in the color correction necessity confirmation screen 200 (S11: NO), the CPU 22a advances the processing to step S13.

At step S13, the CPU 22a determines whether there are a remaining number of copies that have not been printed, that is, whether the number of copies set on the copy operation screen 100 is plural or not. Here, for example, if there are a remaining number of copies that have not been printed, that is, if the set number of copies is plural (S13: YES), the CPU 22a advances the processing to step S15. On the other hand, if there are no remaining number of copies that have not been printed, that is, if the set number of copies is only one (S13: NO), the CPU 22a advances the processing to step S19 described below.

At step S15, the CPU 22a starts printing of the remaining number of copies, that is, controls the image former 16 to do so. In addition, the CPU 22a displays the above-described printing-in-progress screen on the display 20a. Then, the CPU 22a advances the processing to step S17.

At step S17, the CPU 22a waits for the printing of the remaining number of copies to be completed (S17: NO). When the printing of the remaining number of copies is completed (S17: YES), the CPU 22a advances the processing to step S19. As described above, even if there are no remaining copies that have not been printed at step S13 (S13: NO), the CPU 22a advances the processing from step S13 to step S19.

At step S19, the CPU 22a executes end processing to end the copy processing. This end processing includes processing of displaying the above-described copy end screen on the display 20a for a certain period of time. With the execution of this end processing, the CPU 22a ends the color correction control task.

In contrast, when the CPU 22a advances the processing from the above-described step S11 to step S21, the CPU 22a causes the color composition sheet 300 to be printed at step S21, that is, controls the image former 16 to do so. As described above, the color composition sheet 300 is output on the basis of the contents of the correspondence table 756b. Then, the CPU 22a advances the processing to step S23.

At step S23, the CPU 22a displays the color correction setting screen 400 on the display 20a. Then, the CPU 22a advances the processing to step S25.

At step S25, the CPU 22a waits for the color correction setting screen 400 to accept some operation (S25: NO). When the color correction setting screen 400 accepts some operation (S25: YES), the CPU 22a advances the processing to step S27.

At step S27, the CPU 22a determines whether the operation accepted at step S25 is an operation of the "OK" key 410 in the color correction setting screen 400 or not. Here, for example, if the operation accepted at step S25 is the operation of the "OK" key 410 (S27: YES), the CPU 22a advances the processing to step S33 described below. Meanwhile, when the operation accepted at step S25 is not the operation of the "OK" key 410 (S27: NO), the CPU 22a advances the processing to step S29.

At step S29, the CPU 22a determines whether the operation accepted at step S25 is an operation of the "Cancel" key 414 in the color correction setting screen 400 or not. Here, for example, if the operation accepted at step S25 is an operation of the "Cancel" key 414 (S29: YES), the CPU 22a returns the processing to the above-described step S7. As a result, instead of the color correction setting screen 400, the color correction necessity confirmation screen 200 is displayed again on the display 20a. On the other hand, if the operation accepted in step S25 is not the operation of the "Cancel" key 414 (S29: NO), the CPU 22a advances the processing to step S31.

At step S31, the CPU 22a executes processing in accordance with the operation accepted at step S25. The processing referred to here includes processing in response to an operation of an arbitrary patch 404 in the color correction setting screen 400 and processing in response to an operation of the "Reset" key 412. After execution of this step S31, the CPU 22a waits for the color correction setting screen 400 to accept some operation again, and returns the processing to step S25.

On the other hand, when the CPU 22a advances the processing from the above-described step S27 to step S33, the CPU 22a determines at step S33 whether a correction value other than "0" is set for any color shade on the color correction setting screen 400, that is, whether the color correction is required or not. Here, for example, if color correction is required, that is, if a correction value other than "0" is set for any color shade (S33: YES), the CPU 22a advances the processing to step S37 described below. On the other hand, if color correction is not required, that is, if a correction value other than "0" is not set for any color shade (S33: NO), the CPU 22a advances the processing to step S35.

At step S35, the CPU 22a displays the above-described message screen on the display 20a for a certain period of time instead of the color correction setting screen 400. Then, the CPU 22a returns the processing to the above-described step S7. As a result, the color correction necessity confirmation screen 200 is displayed again on the display 20a.

In contrast, when the CPU 22a advances the processing from the above-described step S33 to step S37, the CPU 22a stores the setting contents on the color correction setting screen 400 in the color correction table 756d at step S37, that is, updates the color correction table 756d. As a result, the setting contents on the color correction setting screen 400 are finalized. Then, the CPU 22a advances the processing to step S39.

At step S39, the CPU 22a performs simulation to see whether color correction according to the contents stored in the color correction table 756d, that is, the finalized correction values, is possible or not. Then, the CPU 22a advances the processing to step S41.

At step S41, the CPU 22a determines whether color correction according to the finalized correction values is possible as the result of the simulation at step S39 or not. Here, for example, if the color correction according to the finalized correction values is possible (S41: YES), the CPU 22a advances the processing to step S43. On the other hand, if the color correction according to the finalized color correction is impossible (S41: NO), the CPU 22a advances the processing to step S55 described below.

At step S43, the CPU 22a displays the color correction execution confirmation screen 500 on the display 20a instead of the color correction setting screen 400. Then, the CPU 22a advances the processing to step S45.

At step S45, the CPU 22a waits for the color correction execution confirmation screen 500 to accept some operation (S45: NO). When the color correction execution confirmation screen 500 accepts some operation (S45: YES), the CPU 22a advances the processing to step S47.

At step S47, the CPU 22a determines whether the operation accepted at step S45 is an operation of the "Yes" key 504 in the color correction execution confirmation screen 500 or not. Here, for example, if the operation accepted at step S45 is an operation of the "Yes" key 504 (S47: YES), the CPU 22a advances the processing to step S49. On the other hand, if the operation accepted at step S45 is not the operation of the "Yes" key 504, that is, if the operation accepted at step S45 is the operation of the "No" key 506 in the color correction execution confirmation screen 500 (S47: NO), the CPU 22a returns the processing to the above-described step S7. As a result, instead of the color correction execution confirmation screen 500, the color correction necessity confirmation screen 200 is displayed again on the display 20a.

At step S49, the CPU 22a enables the color corrector 14b of the image processor 14. As a result, color correction processing by the color corrector 14b is executed. This color correction processing is executed on the basis of the contents of the color correction table 756d. Then, the CPU 22a advances the processing to step S51.

At step S51, the CPU 22a controls the image former 16 to start printing of all the number of copies, that is, causes the image former 16 to do so, on the basis of the data for printing after the color correction processing by the color corrector 14b, that is, the data after color correction. In addition, the CPU 22a displays the above-described printing-in-progress screen on the display 20a. Then, the CPU 22a advances the processing to step S53.

At step S53, the CPU 22a waits for the printing of all the number of copies to be completed (S53: NO). When the printing of all the number of copies is completed (S53:

YES), the CPU 22*a* advances the processing to the above-described step S19 and executes the end processing of step S19.

In contrast, when the CPU 22*a* advances the processing from the above-described step S41 to step S55, the CPU 22*a* displays the center notification confirmation screen 600 on the display 20*a* instead of the color correction setting screen 400 in step S55. Then, the CPU 22*a* advances the processing to step S57.

At step S57, the CPU 22*a* waits for the center notification confirmation screen 600 to accept some operation (S57: NO). When the center notification confirmation screen 600 accepts some operation (S57: YES), the CPU 22*a* advances the processing to step S59.

At step S59, the CPU 22*a* determines whether the operation accepted at step S57 is an operation of the "Yes" key 608 in the center notification confirmation screen 600 or not. Here, for example, if the operation accepted at step S57 is the operation of the "Yes" key 608 (S59: YES), the CPU 22*a* advances the processing to step S61. On the other hand, if the operation accepted at step S57 is not the operation of the "Yes" key 608, that is, if the operation accepted at step S57 is the operation of the "No" key 610 in the center notification confirmation screen 600 (S59: NO), the CPU 22*a* advances the processing to step S63 described below.

At step S61, the CPU 22*a* executes center notification processing for transmitting the above-described current status information to the analysis server 50. Also, upon execution of the center notification processing at step S61, the CPU 22*a* displays the above-described communication-in-progress screen on the display 20*a* instead of the center notification confirmation screen 600. When the CPU 22*a* confirms that the current status information has been received by the analysis server 50, the CPU 22*a* advances the processing to step S63. As described above, when the CPU 22*a* determines at step S59 that the operation accepted at step S57 is the operation of the "No" key in the center notification confirmation screen 600 (S59: NO), the CPU 22*a* also advances the processing from step S59 to step S63.

At step S63, the CPU 22*a* determines whether there are a remaining number of copies that have not been printed, that is, whether the number of copies set on the copy operation screen 100 is plural or not. Here, for example, if there are a remaining number of copies that have not been printed, that is, if the set number of copies is plural (S63: YES), the CPU 22*a* advances the processing to step S65. On the other hand, if there are no remaining number of copies that have not been printed, that is, if the set number of copies is only one (S63: NO), the CPU 22*a* advances the processing to the above-described step S19, and executes the end processing of step S19.

At step S65, the CPU 22*a* displays the above-described remaining number of copies print confirmation screen on the display 20*a*. This remaining number of copies print confirmation screen is displayed on the display 20*a* instead of the communication-in-progress screen, when the center notification processing at step S61 is executed, for example. On the other hand, the remaining number of copies print confirmation screen is displayed on the display 20*a* instead of the center notification confirmation screen 600 when the center notification processing at step S61 is not executed. As described above, the remaining number of copies print confirmation screen includes the "Yes" key and the "No" key. After execution of this step S65, the CPU 22*a* advances the processing to step S67.

At step S67, the CPU 22*a* waits for the remaining number of copies print confirmation screen to accept some operation (S67: NO). When the remaining number of copies print confirmation screen accepts some operation (S67: YES), the CPU 22*a* advances the processing to step S69.

At step S69, the CPU 22*a* determines whether the operation accepted at step S67 is the operation of the "Yes" key in the remaining number of copies print confirmation screen or not. Here, for example, if the operation accepted at step S67 is the operation of the "Yes" key in the remaining number of copies print confirmation screen (S69: YES), the CPU 22*a* advances the processing to the above-described step S15 to start printing of the remaining number of copies. On the other hand, if the operation accepted at step S67 is not the operation of the "Yes" key in the remaining number of copies print confirmation screen, that is, if the operation accepted at the step S67 is the operation of the "No" key in the remaining number of copies print confirmation screen (S69: NO), the CPU 22*a* advances the processing to the above-described step S19 and executes the end processing of step S19.

As described above, according to this first embodiment, or particularly according to the color correction function, the expression color of each pixel constituting the output image based on the image of the manuscript is assigned to one of the color shades in the number of 70, and the result of the assignment is indicated as a list 302 on the color composition sheet 300. At the same time, the color correction setting screen 400 having a list 402 similar to the list in the color composition sheet 300 is displayed on the display 20*a*, and each color shade can be individually corrected in accordance with the list 402 (patches 404, 404, . . . ) in the color correction setting screen 400. Accordingly, the user can correct each color shade individually while referring to the color composition sheet 300 or while comparing the color composition sheet 300 and the actual output image (printed matter) with each other, and thus can correct the color shade of the output image in detail. Moreover, since the number of color shades that can be corrected by the user is limited to an appropriate number of 70, the operation to correct the color shades in question is facilitated. In other words, the color correction function of the first embodiment allows detailed correction of the color shade of the output image, and the correction (color correction) can be performed with an easy operation.

The color discriminator 14*a* of the image processor 14 in the first embodiment is an example of the discriminator according to the present invention. And the color corrector 14*b* of the image processor 14 is an example of the corrector according to the present invention. Moreover, the CPU 22*a* that displays the color correction setting screen 400 on the display 20*a*, or the CPU 22*a* that executes step S23 in the color correction control task in more detail, constitutes an example of the display according to the present invention in cooperation with the display 20*a*.

Further, the CPU 22*a* that controls the image former 16 to output the color composition sheet 300, or the CPU 22*a* that executes step S21 in the color correction control task in more detail, is an example of the image forming controller according to the present invention. And the analysis server 50 is an example of the analysis device according to the present invention. In addition, the CPU 22*a* transmits analysis information to the analysis server 50 via the communicator 26, and such CPU 22*a*, or the CPU 22*a* that executes step S61 in the color correction control task in more detail, constitutes an example of a transmitter according to the present invention in cooperation with the communicator 26.

In addition, the CPU 22*a* that displays the center notification confirmation screen 600 on the display 20*a*, or the CPU 22a that executes step S55 in the color correction control task in more detail, constitutes an example of an inquirer according to the present invention in cooperation with the display 20a. Moreover, the touch panel 20b when the center notification confirmation screen 600 is in a displayed state, or strictly speaking, the touch panel 20b and the CPU 22a constitute an example of a response acceptor according to the present invention.

Second Embodiment

Next, a second embodiment of the present invention will be described.

Figure 18:
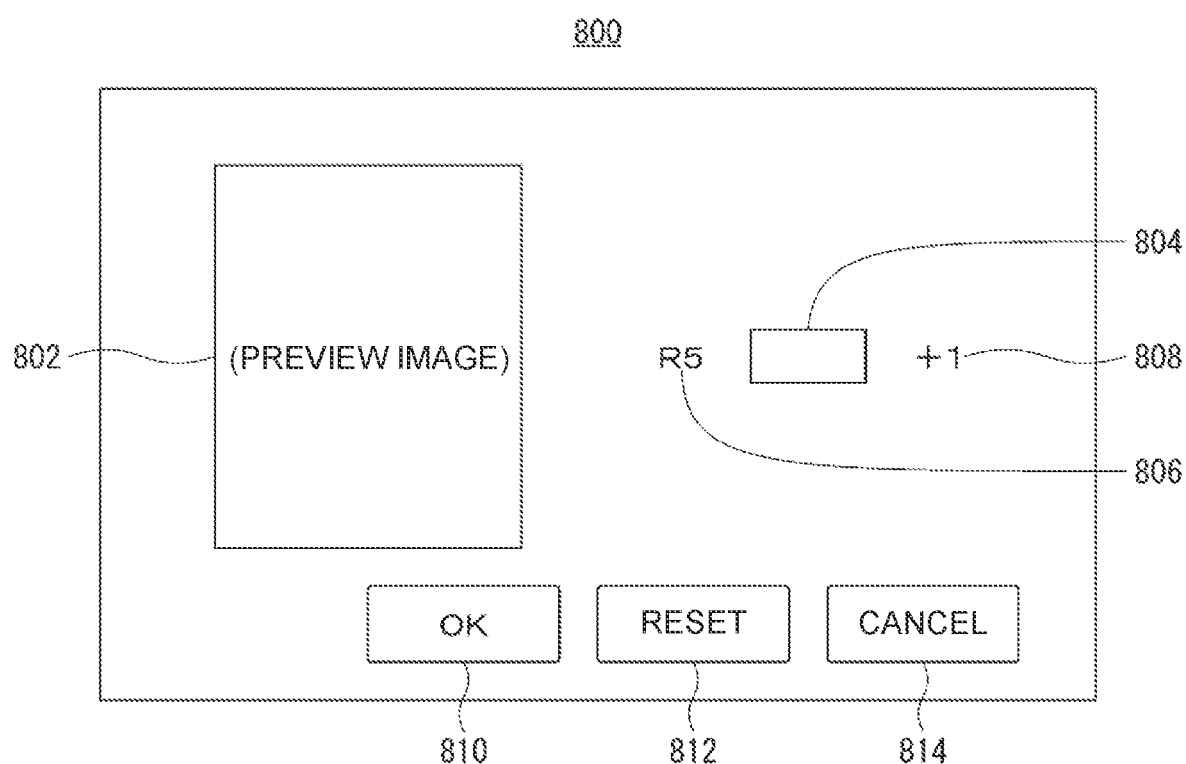
FIG. 18 is a diagram illustrating an example of a color correction setting screen in a second embodiment of the present invention.

As described above, in the first embodiment, when the "Yes" key 204 in the color correction necessity confirmation screen 200 is operated, the color composition sheet 300 is output in response thereto, and the color correction setting screen 400 is displayed on the display 20a with the list 402 similar to that in the color composition sheet 300 disposed. In contrast, in this second embodiment, when the "Yes" key 204 in the color correction necessity confirmation screen 200 is operated, the color composition sheet 300 is not output, and a color correction setting screen 800 as shown in FIG. 18 is displayed on the display 20a. It is to be noted that, since configuration other than this in this second embodiment is the same as that of the first embodiment, detailed explanation of parts similar to those of the first embodiment is omitted.

In the color correction setting screen 800 in this second embodiment, a color preview image 802 based on an image of a manuscript, or strictly speaking based on the read image data, is disposed on the left side thereof, for example. This preview image 802 functions as an operator that can accept a touch operation by a user. When an arbitrary spot in this preview image 802 is touched, a color shade (representative color) of a pixel in the data for printing corresponding to the touched spot, or strictly speaking, the rectangular patch 804 representing the color shade, is disposed on the right side of the preview image 802. In addition, in the vicinity of the patch 804, or to the left side of the patch 804, for example, an appropriate character string indicating the number of the color shade represented by the patch 804, or a character string 806, which is "R5" in FIG. 18, is disposed. The character string 806, which is "R5", indicates the number 5 in the R system, that is, the color shade of the number 5 in the R system is expressed by the patch 804.

Moreover, the patch 804 functions as an operator for setting a correction value for density of the color shade represented by the patch 804. For example, each time the patch 804 is operated, the correction value for the density of the color shade represented by the patch 804 changes in a rotary manner, such as "+1"→"+2"→"−2"→"−1"→"0". The larger this correction value is, the higher (darker) the density becomes, while the smaller this correction value is, the lower (lighter) the density becomes. In addition, when the correction value other than "0" is set, a character string representing the correction value, or a character string 808, which is "+1" in FIG. 18, appears in the vicinity of the patch 804, or on the right side of the patch 804, for example. In other words, FIG. 18 shows an example in which the correction value of "+1" is set for the color shade of the number 5 in the R system. It is to be noted that, when the color correction setting screen 800 is initially displayed, the patch 804 and character strings 806 and 808 are not disposed. Moreover, when the correction values are set for a plurality of color shades, a plurality of the patches 804 and character strings 806 and 808 are disposed correspondingly to the plurality of color shades, for example, vertically (along the vertical direction in FIG. 18).

In addition, three operation keys 810, 812 and 814 are disposed horizontally at a lower part in the color correction setting screen 800, or strictly speaking at a slightly rightward position. These three operation keys 810, 812 and 814 are operators that perform the same functions as the "OK" key 410, the "Reset" key 412 and the "Cancel" key 414 of the color correction setting screen 400 in the first embodiment. That is, the operation key 810 on the left end is an "OK" key for instructing confirmation of setting contents in the color correction setting screen 800. And the operation key 812 at the center is a "Reset" key for instructing return the color correction setting screen 800 to an initial state in which the color correction setting screen 800 is displayed. The operation key 814 on the right end is a "Cancel" key for instructing cancelation of the color correction setting on the color correction setting screen 800.

As described above, in this second embodiment, the color correction setting screen 800 is displayed on which the color preview image 802 is disposed. Therefore, the user can correct the color shade in detail by touching (instructing) a spot on the preview image 802 where the user wants to correct the color shade in the output image while referring to the actual output image (printed matter), that is, by an easy operation.

OTHER APPLICATION EXAMPLES

Each of the above-described embodiments is a specific example of the present invention and does not limit a technical scope of the present invention. In other words, the present invention can be applied to aspects other than the above-described embodiments.

For example, for each of the screens, including the copy operation screen 100, the color correction setting screens 400 and 800, among others, are not limited to the configuration described here, including their respective designs. Another screen of a different configuration may be employed as long as it exerts the same function as those of the respective screens. The correction value of the color shade in the color correction setting screens 400 and 800 may be indicated not as a value such as "+1" or "−1" but as a percentage or simply as "darker" or "lighter".

And the color composition sheet 300 in the first embodiment is not limited to the configuration described here, either, including its design. For example, the total number of color shades is not limited to 70, but can be larger or smaller than this. However, it is desirable that the total number of color shades are such that differences can be recognized by human eyes to a necessary and sufficient degree and that color correction can be executed to a necessary and sufficient degree of detail. And the color system is not limited to the seven color systems of R, G, B, C, M, Y and K.

Furthermore, although each of the above-described embodiments describes a case in which only one manuscript (for one page) is used, the present invention can also be applied to a case in which the manuscripts are in plural, especially when images of the plurality of manuscripts are continuously read by the image reader 12 by an automatic document feeder described above. In this case, the correction value for the first manuscript may be applied to all the manuscripts, or individual correction value may be applied to each manuscript, for example.

Moreover, the current status information transmitted to the analysis server 50 includes, but is not limited to, the contents of the correspondence table 756b and the contents of the color correction table 756d. For example, only information about pixel values and color categories in the CMYK color space after color conversion in the correspondence table 756b may be transmitted to the analysis server 50 as current status information together with the contents of the color correction table 756d.

In addition, in each of the above-described embodiments, the color correction function as one of auxiliary functions of the copying function has been described, but a similar color correction function can also be applied to the printing function. In other words, the printing function can also realize color correction in the same manner as in each of the embodiments.

And in each of the above-described embodiments, the multifunction machine 10, which is one type of image forming apparatus, is used as an example, but is not limited thereto. In other words, the present invention can be applied to exclusive copiers and printers.

Moreover, the present invention can be provided not only in an apparatus form of an image forming apparatus, but also in the form of a program called a color correction control program in the image forming apparatus and in the form of a method called a color correction control method in the image forming apparatus.

Furthermore, the present invention may also be provided in a form of a computer readable storage medium in which a color correction control program for the image forming apparatus is recorded. In this case, the color correction control program recorded in the recording medium is read by a computer of the image forming apparatus and executed by the computer so that an image forming apparatus similar to the present invention is realized. The recording medium referred to here is, for example, a semiconductor medium such as a USB memory and an SD memory card, or a disk medium such as a CD and a DVD. Furthermore, instead of a portable medium, a (built-in) medium incorporated in an image forming apparatus (computer system), such as a ROM or a hard disk drive, may also be applied as the recording medium referred to here.

What is claimed is:

1. An image forming apparatus comprising an image former that forms a color image based on color image data on an image recording medium, the image forming apparatus further comprising:
a discriminator that discriminates to which of a plurality of color categories, including combinations of a plurality of color systems and a plurality of color types with different attributes for each of the color systems, an expression color of each pixel expressed by the image data belongs;
a display that displays a list of representative colors each of which is a representative of the expression color belonging to each of the plurality of color categories;
an operation acceptor that accepts a user operation that specifies any one of the representative colors and instructing correction of a corresponding component corresponding to the representative color in the image data; and
a corrector that corrects the image data in accordance with a content of the user operation.

2. The image forming apparatus according to claim 1, further comprising:
an image forming controller that controls the image former to form a list image representing the list of representative colors on the image recording medium.

3. The image forming apparatus according to claim 2, wherein
the operation acceptor includes a plurality of operators which correspond to the list of representative colors displayed by the display and which can individually accept the user operations.

4. The image forming apparatus according to claim 3, wherein
the display has a display surface on which the list of representative colors is displayed; and
the operation acceptor has a touch panel which is provided so as to overlap the display surface and which comprises the plurality of operators.

5. The image forming apparatus according to claim 1, wherein
the display also displays a color preview image based on the image data and, when the user operation instructing an arbitrary spot in the preview image is accepted by the operation acceptor, displays the representative color corresponding to the spot.

6. The image forming apparatus according to claim 1, further comprising a transmitter that transmits current status information including a discrimination result by the discriminator and a content of the user operation to an external analysis device, when correction by the corrector in accordance with the content of the user operation is not feasible.

7. The image forming apparatus according to claim 6, further comprising:
an inquirer that inquires a user whether or not to transmit the current status information to the analysis device, when correction by the corrector in accordance with the user operation is not feasible; and
a response acceptor that accepts a response by the user to the inquiry by the inquirer, wherein
the transmitter transmits the current status information to the analysis device, when the response instructing transmission of the current status information to the analysis device is accepted by the response acceptor.

8. The image forming apparatus according to claim 1, wherein
the apparatus is a multifunction machine.

9. A non-transitory computer readable recording medium storing a color correction control program in an image forming apparatus including an image former that forms a color image based on color image data on an image recording medium and an operation acceptor that accepts a user operation, and causing a computer of the image forming apparatus to execute:
discriminating to which of a plurality of color categories including combinations of a plurality of color systems and a plurality of color types with different attributes for each of the color systems an expression color of each pixel expressed by the image data belongs;
displaying a list of representative colors each of which is a representative of the expression color belonging to each of the plurality of color categories; and
when the user operation specifying any one of the representative colors and instructing correction of a corresponding component corresponding to the representative color in the image data is accepted by the operation acceptor, correcting the image data in accordance with a content of the user operation.

10. A color correction control method in an image forming apparatus including an image former that forms a color image based on color image data on an image recording medium and an operation acceptor that accepts a user operation, comprising:

discriminating to which of a plurality of color categories including combinations of a plurality of color systems and a plurality of color types with different attributes for each of the color systems an expression color of each pixel expressed by the image data belongs;
displaying a list of representative colors each of which is a representative of the expression color belonging to each of the plurality of categories; and
when the user operation specifying any one of the representative colors and instructing correction of a corresponding component corresponding to the representative color in the image data is accepted by the operation acceptor, correcting the image data in accordance with a content of the user operation.

* * * * *